United States Patent [19]

Brenner et al.

[11] Patent Number: 4,650,680
[45] Date of Patent: Mar. 17, 1987

[54] HIGH TEMPERATURE PRIMARY GALVANIC ELEMENT

[75] Inventors: Rolf Brenner, Rainau; Horst-Udo Jose, Fichtenau; Gerd Jung, Ellwangen-Rindelback; Robert Koder, Ellwangen-Rotenbach, all of Fed. Rep. of Germany

[73] Assignee: Varta Batterie A.G., Hanover, Fed. Rep. of Germany

[21] Appl. No.: 657,386

[22] Filed: Oct. 3, 1984

[30] Foreign Application Priority Data

Oct. 15, 1983 [DE] Fed. Rep. of Germany ....... 3337570

[51] Int. Cl.⁴ .................. H01M 2/14; H01M 2/16; H01M 4/00
[52] U.S. Cl. .................................. 429/129; 429/144; 429/145; 429/133; 429/94; 429/251; 429/252
[58] Field of Search ............ 429/144, 145, 133, 129, 429/206, 229–231, 219, 224, 94, 251, 252

[56] References Cited

U.S. PATENT DOCUMENTS

| | | | |
|---|---|---|---|
| 3,287,166 | 11/1966 | Arrance | 429/219 |
| 3,997,366 | 12/1976 | Davis, Jr. | 429/144 |
| 4,034,144 | 7/1977 | Chireau | 429/144 |
| 4,091,185 | 5/1978 | Chireau et al. | 429/144 |
| 4,105,835 | 8/1978 | Guitton et al. | 429/133 |
| 4,122,241 | 10/1978 | Ciliberti, Jr. | 429/133 |
| 4,273,840 | 6/1981 | Machi et al. | 429/144 |
| 4,287,272 | 9/1981 | Machi et al. | 429/144 |
| 4,378,414 | 3/1983 | Furukawa et al. | 429/144 |
| 4,468,441 | 8/1984 | D'Agostino | 429/251 X |

*Primary Examiner*—Brian E. Hearn
*Assistant Examiner*—Stephen J. Kalafut
*Attorney, Agent, or Firm*—Weiser & Stapler

[57] ABSTRACT

In view of operating temperatures above 100° C., a silver oxide/zinc cylindrical cell is provided with a housing cup which is enclosed by a sealing element formed of PTFE, and which incorporates a double-layer separator whose inner layer is formed of a semipermeable ion exchange membrane and whose outer layer is formed of a flexible ceramic material. The element is protected against extreme overpressure, in excess of 65 bar, by a rupture line in the form of an indentation in the bottom of the cup.

21 Claims, 3 Drawing Figures

HIGH TEMPERATURE PRIMARY GALVANIC ELEMENT

BACKGROUND OF THE INVENTION

The present invention relates to a primary galvanic element having an alkaline electrolyte, a negative zinc electrode, a positive silver (I) oxide or manganese dioxide electrode and a separator, and which is dischargable at high temperature.

In technology, there exists the need for an electrochemical current source which assures an energy supply for instruments and illuminating devices and which is independent of the power grid, even under extreme temperature conditions. As an example, for use in polar regions or as meteorological probes, batteries are required which have appropriate low temperature characteristics resulting from a non-freezing electrolyte. The exploration and recovery of valuable earth resources from great depth requires battery-operated implements which can be lowered into bore holes and which can continue to operate reliably even at temperatures above 100° C.

Up to now, battery technology has not fully accommodated the temperature range between about 80° and 160° C. This is because, in conventional batteries, the vapor pressure of the electrolyte liquid (which is then already substantial and which is especially increased as a result of deterioration of the primarily organic separator material) impedes operability. On the other hand, this same temperature range is much too low for the alternative use of cells with a molten liquid electrolyte.

From U.S. Pat. No. 3,287,166, there is known a cell based on the system silver oxide/zinc and nickel oxide/cadmium which is operable at temperatures of 100° C. and above, and in which the separator which separates the electrodes of different polarity has on both sides a coating of an inorganic fiber material (inorganic fiber paper). The separator itself can also be inorganic, or an organic type. However, it will be appreciated that construction of such a battery is awkward.

SUMMARY OF THE INVENTION

It is therefore an object of the present invention to provide a primary galvanic element which is more easily manufactured, which has a high energy density, which can be heavily loaded, which can be economically manufactured, and which is characterized by good shelf life.

These and other objects are achieved in accordance with the present invention by means of a primary galvanic element having characteristics such as are identified in claim 1, with the dependent claims defining still further desirable embodiments.

A preferred embodiment primary galvanic element embodying the present invention is further described below, with reference to the following illustrations.

BRIEF DESCRIPTION OF THE DRAWINGS

In the several views provided, like reference numerals denote similar structure.

DETAILED DESCRIPTION OF A PREFERRED EMBODIMENT

Figure 1:
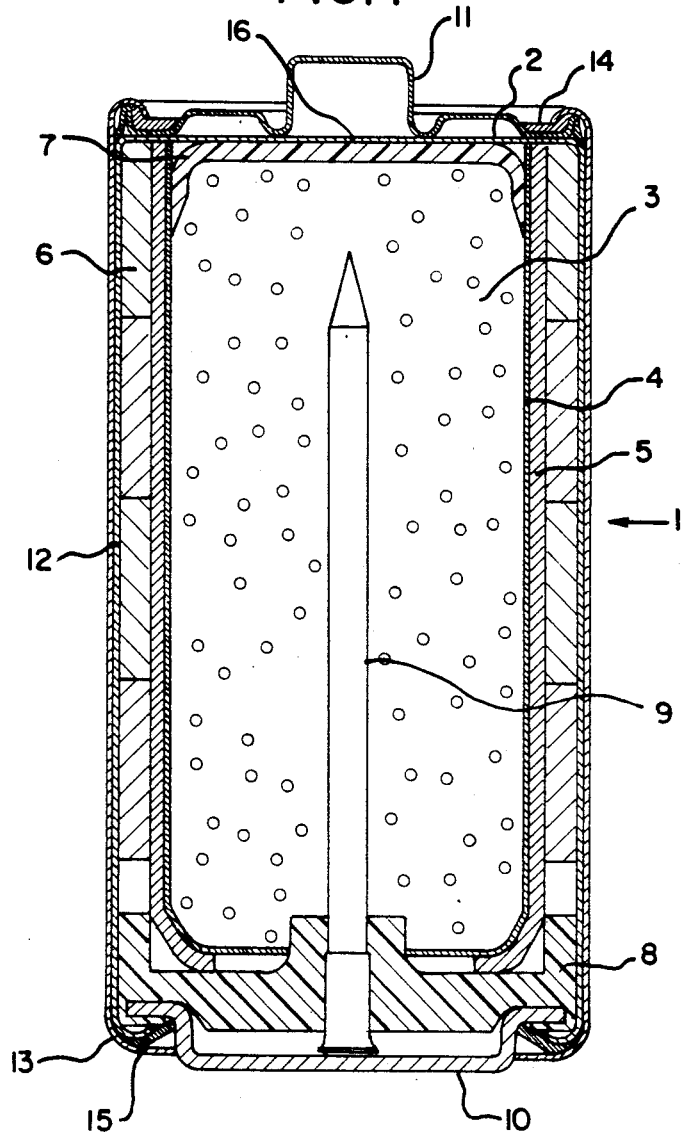
FIG. 1 is a cross-section of an entire cell.

Although specific forms of the invention have been selected for illustration in the drawings, and the following description is drawn in specific terms for the purpose of describing these forms of the invention, this description is not intended to limit the scope of the invention which is defined in the appended claims.

With reference to FIG. 1, primary element 1 is provided with a housing cup 2 which contains, in concentric arrangement, an innermost zinc paste 3 which forms the negative electrode, a surrounding two-layer separator 4, 5, and an outwardly positioned positive silver (I) oxide or manganese dioxide electrode 6 composed of a plurality of pressed bodies which combine to form a larger annular cylinder. Housing cup 2 further contains an insulating bowl-shaped enclosure 7 of polytetrafluorethylene (PTFE) which covers the entire cross-section of the zinc electrode 3.

In accordance with the present invention, there is used as the inwardly positioned separator layer 4 a foil material whose essential property is that of a semipermeable ion exchange membrane. The foil material comprises a support membrane, which is formed of a plastic, preferably a polyethylene of low density, which, as a result of special treatment under the influence of an ionizing stream, exhibits a three-dimensional network in its molecular chains and which, as a result of this configuration, is characterized by exceptional stability in all solvents. In this configuration, electrical resistance decreases with the degree of transverse networking. If desired, the foil material used may take the form of a sandwich-like layered laminate, one example being a cellophane positioned between two polyethylene foils. Such composite foils, which are generally known under the designation "Permion" membranes, form a barrier against silver migration and against the dendrite growth which is encountered in the zinc electrodes, providing especially desirable affects in a cell embodying the present invention.

The outwardly positioned separator layer 5 is formed of a commercial ceramic paper comprised of heat-resistant fibers of high purity. For the production of such insulating papers, there are used, for example, aluminum oxide silicate fibers of glass fibers with various additives such as fillers, organic binders or other fibers, whereby predetermined thermal and mechanical properties can be obtained. Such papers are excellent electrical insulators, and are chemically stable against attack by strong media with the exception of fluoric and phosphoric acid. The blotting-paper-like consistency and high flexibility of such materials, which differentiates them from conventional asbestos papers, makes ceramic paper used in accordance with the present invention particularly suitable as a separator/enclosure. The separator layer 5 also holds the principal quantity of the alkaline electrolyte.

The open end of the housing cup 2 is enclosed by a sealing element 8 formed of a temperature stable plastic, preferably polytetrafluoroethylene such as "Teflon PFA 340". A centrally disposed negative current take-off conductor 9, formed of brass wire, protrudes through the sealing element 8 and into the zinc electrolyte 3. A contact disk 10 rests peripherally upon the sealing element 8 and is tightly crimped in position over the sealing element 8 and the take-off conductor 9 as shown. Thus, the contact disk 10 forms the negative cell pole.

The opposite end or bottom of the housing cup 2 is provided with a closure cap 11 which rests directly upon the housing cup 2 and Cwhich forms the positive cell pole. The closure cap 11 is therefore in electrical contact with the positive electrode 6.

To complete the cell, the above described elements are packed in a sheet metal cladding 13 with a paper cover 12 interposed therebetween. The rims of the sheet metal cladding 13 are open on both sides, and are crimped over the upper and lower rims of the cell. Insulating rings 14, 15 of pasted cardboard are used to separate the rims of the cell from the rims of the sheet metal cladding.

Figure 2:
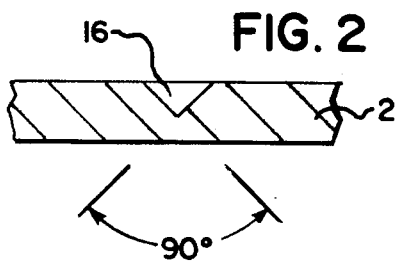
FIG. 2 is an enlarged cross-section of the bottom of the housing cup.

With reference to FIG. 2, it has proven particularly desirable to provide the bottom of the housing cup 2 in accordance with the present invention with a rupture line in the form of an indentation 16 located on the outside of the cup. In connection with a cup formed of nickel-plated steel, the indentation 16 has a depth which leaves in place only about 35% of the original wall thickness of the cup, and extends across the middle of the bottom of the cup over a length which corresponds to about 70% of its diameter. The side walls of the indentation are inclined, and assume an angle of about 90° C. with respect to each other. Taking into account manufacturing tolerances, the rupture line developed is so arranged that its rupture pressure is on the order of at least 65 bar and at the most 85 bar.

It has further proven advantageous to select a PTFE material for use in forming the above-mentioned plastic parts, such as the bowl-shaped insert 7 and the sealing element 8. The primary galvanic element embodying the present invention is therefore fully capable of resisting the high operating temperatures which are anticipated, and also of meeting all of the safety requirements regarding the dangers of explosion and electrolyte escape.

Figure 3:
FIG. 3 shows a typical discharge curve.

FIG. 3 illustrates the discharge curve of a primary galvanic element according to the present invention, measured at +160° C. At a load resistance of 7.5 ohms, the initial discharge current was 200 ma.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A primary element which is dischargable at high temperature and having an alkaline electrolyte, a negative zinc electrode, a positive silver (I) oxide or manganese dioxide electrode, and a cup-shaped metal housing containing in concentric arrangement an innermost negative zinc electrode and an outermost positive electrode in the form of an annular cylinder with an intermediate separator,
    wherein the separator is formed of at least two layers, the inner layer of which is a semi-permeable ion exchange membrane which surrounds the negative zinc electrode and the outer layer of which is a temperature resistant ceramic material which is surrounded by the positive electrode, and
    wherein a first end of the metal housing has a plastic bowl-shaped insert covering the cross-section of the zinc electrode and a second end of the metal housing is enclosed by a sealing element formed of a temperature stable plastic through which extends a negative current take-off conductor.

2. The primary element of claim 1 wherein the inner layer is a foil.

3. The primary element of claim 2 wherein the foil is formed of a plastic.

4. The primary element of claim 3 wherein the plastic is low density polyethylene.

5. The primary element of claim 4 wherein the foil is treated so as to exhibit a three dimensional network in its molecular chains.

6. The primary element of claim 2 wherein the foil is a sandwich-like layered laminate.

7. The primary element of claim 6 wherein the foil comprises a cellophane positioned between two polyethylene foils.

8. The primary element of claim 1 wherein the outer layer is formed of a ceramic paper.

9. The primary element of claim 8 wherein the ceramic paper is comprised of heat resistant fibers.

10. The primary element of claim 9 wherein the ceramic paper is formed of aluminum oxide silicate fibers or glass fibers.

11. The primary element of claim 8 wherein the ceramic paper is adapted to hold the principal quantity of the alkaline electrolyte.

12. The primary element of claim 1 wherein the bowl-shaped enclosure is formed of polytetrafluorethylene (PTFE).

13. The primary element of claim 1 wherein the sealing element is formed of polytetrafluorethylene (PTFE).

14. The primary element of claim 1 wherein the first end of the metal housing has a rupture means formed therein.

15. The primary element of claim 14 wherein the rupture means is a linear indentation formed on the outside of the metal housing.

16. The primary element of claim 15 wherein the indentation has a depth which leaves in place about 35% of the thickness of the metal housing.

17. The primary element of claim 15 wherein the indentation extends across the middle of the first end of the metal housing over a length which corresponds to about 70% of the diameter of the metal housing.

18. The primary element of claim 15 wherein the linear indentation is comprised of opposed side walls separated by an angle of about 90°.

19. The primary element of claim 1 wherein the ion exchange membrane forms a barrier against silver migration and against dendrite growth.

20. A primary element which is dischargable at high temperature and having an alkaline electrolyte, a negative zinc electrode, a positive silver (I) oxide or manganese dioxide electrode, and a cup-shaped metal housing containing in concentric arrangement an innermost negative zinc electrode and an outermost positive electrode in the form of an annular cylinder with an intermediate separator,
    wherein the separator is formed of at least two layers, the inner layer of which is a semi-permeable ion exchange membrane which surrounds the negative zinc electrode, which forms a barrier against silver migration and against dendrite growth, and which is comprised of a low density polyethylene foil treated under the influence of an ionizing stream so as to exhibit a three-dimensional network in its molecular chains, and the outer layer of which is a temperature resistant ceramic material which is surrounded by the positive electrode, which is chemically stable and an electrical insulator, and which is comprised of aluminum oxide silicate fibers or glass fibers, and wherein a first end of the metal housing has a plastic bowl-shaped insert covering the cross-section of the zinc electrode and a second end of the metal housing is enclosed by a sealing element formed of a temperature stable plastic through which extends a negative current take-off conductor.

21. A galvanic primary element which is dischargable at high temperature and which contains in concentric arrangement in a cup-shaped metal housing an inner, negative zinc electrode and an outer, positive silver (I) oxide or manganese dioxide electrode in the form of a cylinder, with an intermediate separator, and an alkaline electrolyte in contact with the separator and the negative and positive electrodes, wherein the separator is formed of at least two layers, an inner layer surrounding the negative zinc electrode and comprised of a semi-permeable ion-exchange membrane based on a plastic, and an outer layer comprised of a heat-resistant ceramic fiber paper, and wherein a first end of the metal housing has a plastic bowl-shaped insert covering the cross-section of the zinc electrode and a second end of the metal housing is enclosed by a sealing element formed of a heat-resistant plastic through which extends a negative current take-off conductor.

* * * * *